3,809,692
[1,3,5]-THIADIAZINOBISBENZIMIDAZOLES
Rudiger D. Haugwitz, Highland Park, and Venkatachala
  L. Narayanan, Hightstown, N.J., assignors to E. R.
  Squibb & Sons, Inc., New York, N.Y.
No Drawing. Filed July 16, 1971, Ser. No. 163,459
Int. Cl. C07d 93/28
U.S. Cl. 260—243 R                                4 Claims

ABSTRACT OF THE DISCLOSURE

[1,3,5]-thiadiazinobisbenzimidazoles are provided having the structure

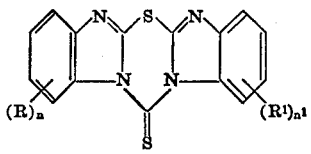

and which are useful as anthelmintic agents.

The present invention relates to 13H-[1,3,5]-thiadiazinobisbenzimidazoles having the structure (I)

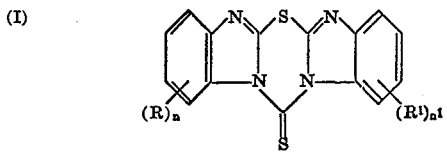

wherein R and $R^1$ are the same or different and can be hydrogen, lower alkyl, aryl, aralkyl, lower alkoxy, aroyl, substituted aryl, lower alkylthio, acyl, trifluoromethyl, nitro, halogen, cyano, amido ($R^2CONH-$), substituted amino, dialkylaminoalkyl or carbamate ester ($NHCOOR^2$ wherein $R^2$ is lower alkyl or aryl) and $n$ and $n^1$ are 1 or 2.

The lower alkyl groups represented by the above R, $R^1$ and $R^2$ groups include straight or branched chain aliphatic hydrocarbon radicals having up to and including seven carbon atoms, such as methyl, ethyl, propyl, isopropyl, butyl, s-butyl, isobutyl, t-butyl, amyl, hexyl, heptyl, and the like. The lower alkyl groups can include as substituents any of the aryl groups mentioned below.

The lower alkoxy groups include straight and branched chain radicals of up to and including seven carbon atoms, corresponding to the above alkyl groups, e.g., methoxy, ethoxy, propoxy, isopropoxy, and the like.

The term "halogen" includes each of the four halogens, but fluorine and chlorine are preferred.

The substituted amino groups include mono- or di-lower alkyl- or arylamino where lower alkyl and aryl are as defined herein, such as methylamino, ethylamino, isopropylamino, heptylamino, dimethylamino, diethylamino, ethylmethylamino, butylmethylamino, ethyl i-propylamino, anilino, diphenylamino, naphthylamino, or N-methyl-N-phenylamino and the like.

The term "aryl" includes monocyclic or bicyclic monovalent aromatic ring systems such as phenyl or naphthyl. These aryl radicals can include as substituents halogen, nitro or any of the alkyl groups mentioned hereinbefore.

The acyl and aroyl groups included herein are derived from hydrocarbon carboxylic acids of less than twelve carbon atoms, which may be exemplified by the lower alkanoic acids (e.g., formic, acetic, propionic, butyric, valeric), the lower alkenoic acids (e.g., acrylic, methacrylic, crotonic, 3-butenoic and senecioic acids), the monocyclic aryl-lower alkanoic acids [e.g., phenacetic, β-phenylpropionic, α-phenylbutyric, and 5-(p-methylphenyl) pentanoic acids], the cycloalkyl carboxylic acids (e.g., cyclobutane carboxylic acid, cyclopentane carboxylic acid and cyclohexane carboxylic acid), the cycloalkenyl carboxylic acids (e.g., 2-cyclobutene carboxylic acid and 3-cyclopentene carboxylic acid), the cycloalkyl and cycloalkenyl-lower alkanoic acids [e.g., cyclohexaneacetic, α-cyclopentanebutyric, 2-cyclopenteneacetic and 3-(3-cyclohexene)pentenoic acid], and the like.

Preferred are those compounds wherein R and $R^1$ are hydrogen or R is 2,3-dimethyl and $R^1$ is 9,10-dimethyl and $n$ and $n^1$ are each 2.

Examples of compounds falling within the present invention include, but are not limited to, the following set out in Table A below.

TABLE A

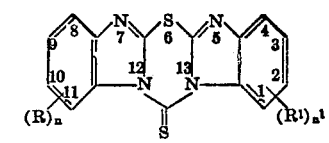

| | $R^1$ | R | $n$ | $n^1$ |
|---|---|---|---|---|
| 1 | H | H | | |
| 2 | $CH_3$ (2, 3) | $CH_3$ (9, 10) | 2 | 2 |
| 3 | Cl (2, 3) | Cl (9, 10) | 2 | 2 |
| 4 | Cl (3) | H | 1 | |
| 5 | CN (1, 4) | H | 2 | |
| 6 | $OCH_3$ (2, 3) | H | 2 | |
| 7 | $CH_3CONH$ (3) | $CH_3CONH$ (9) | 1 | 1 |
| 8 | $NO_2$ (3) | $NO_2$ (9) | 1 | 1 |
| 9 | Cl-⟨⟩- (4) | Cl-⟨⟩- (8) | 1 | 1 |
| 10 | $CH_3OCONH$ (2) | H | 1 | |
| 11 | $CH_3O$ (3) | I (9) | 1 | 1 |
| 12 | $N(CH_3)_2$ (3) | H | 1 | |
| 13 | $CH_3$ (2, 3) | Cl (9, 10) | 2 | 2 |
| 14 | $SCH_3$ (3) | H | 1 | |
| 15 | $C_3H_7$ (3) | $C_3H_7$(9) | 1 | 1 |
| 16 | ⟨⟩- (2) | $C_3H_7O$ (10) | 1 | 1 |
| 17 | ⟨⟩-$CH_2$- (2) | H | | 1 |
| 18 | $C_3H_7\overset{O}{\overset{\|}{C}}$ (2) | H | | 1 |
| 19 | H | $CF_3$ (9) | 1 | |
| 20 | $SC_2H_5$ (3) | $C_2H_5$ (9, 10) | 2 | 1 |
| $2^1$ | $(CH_3)_2NCH_2$ (3) | H | | 1 |
| 22 | $C_6H_5\overset{O}{\overset{\|}{C}}$ (2) | $C_6H_5\overset{O}{\overset{\|}{C}}$ (10) | 1 | 1 |
| 23 | $CH_3$ (8, 9) | H | 2 | |

Compounds of Formula I are synthesized by reacting sulfides of structure II with thiophosgene.

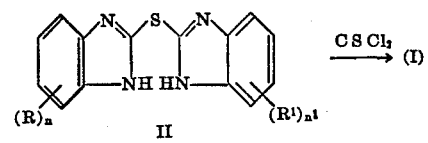

In carrying out the above reaction, the sulfide II is dissolved or suspended in a solvent such as an ether (glyme, ethyl ether) or aromatic hydrocarbon (e.g., benzene, toluene, xylene) and to the solution or suspension is added a base such as a tertiary amine (e.g., triethyl amine or pyridine) or a metal hydride (e.g., sodium hydride, calcium hydride) or a metal such as sodium. The molar ratio of II to amine, metal hydride or metal can range from 1:2 to about 1:3. The temperature can range from 0° to about 140° or higher: for periods of about one hour to 24 hours. After this period, thiophosgene is added. The molar ratio of sulfide II to thiophosgene can range from about 1:0.5 to about 1:1.5. The mixture is kept at ambient or elevated temperatures up to 140° C. for periods ranging from 1 hour to 24 hours.

Compounds of structure II are synthesized by alkylating 2-mercaptobenzimidazole III with 2-halobenzimidazole IV as described in the Journal of the Chemical Society, 3132 (1965):

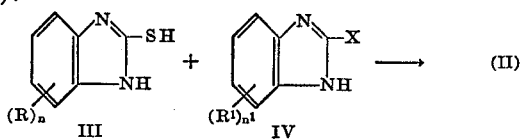

wherein X is Cl, Br.

Alternatively, pentacyclic structures of Formula I where $R=R^1$ and $n=n^1$ can be prepared by reacting 2-thiocyanobenzimidazoles V with carbon disulfide in the presence of a base.

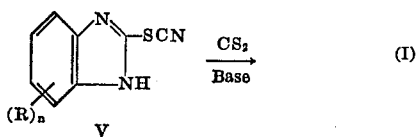

This cyclization is performed in polar solvents such as dimethylsulfoxide, dimethylformamide or glyme in the presence of a base such as a tertiary amine, for example triethyl amine or any of the aforementioned bases. The molar ratio of V to carbon disulfide to base may range from about 2:1:1 to about 2:10:10. Temperatures employed can range from about 0° to 45° for periods of about 1 hour to about 24 hours. Compounds of structure V can be prepared from 2-mercaptobenzimidazoles III and cyanogen halides VI:

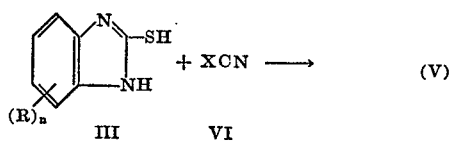

Experimental details for this reaction and additional synthetic routes toward thiocyanates are given in Houben-Weyl, Methoden Der Organischen Chemie, vol. 9, G. Thieme Verlag, Stuttgart (1955).

Benzimidazoles containing a free imino hydrogen are virtually tautomeric systems (A⇌B) and react like tautomeric mixtures. The reaction products (C,D,E) are not necessarily obtained in equal parts but in proportions which differ from compound to compound. Reaction conditions and nature of the substituent on the benzimidazole ring have a pronounced effect on the course of the reaction.

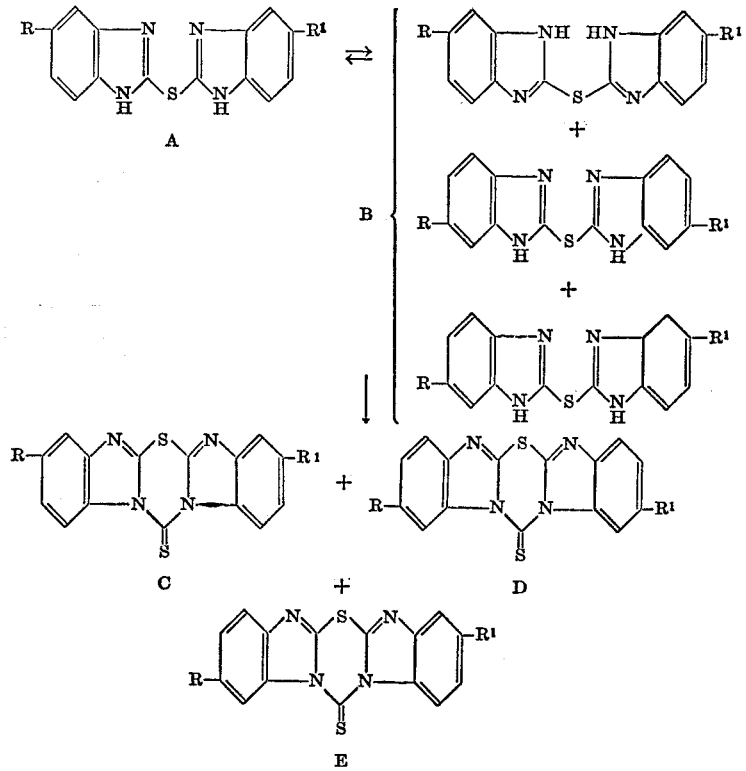

The 2-mercaptobenzimidazole III starting material can be prepared by reacting an o-phenylenediamine

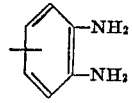

with, for example, potassium ethyl xanthate in accordance with the procedure described in "Organic Synthesis" col. vol. IV, p. 569, to form the mercaptobenzimidazole III.

Examples of suitable starting o-phenylenediamines are set out in Table B below.

TABLE B

| | R (position) | n |
|---|---|---|
| 1 | H | ----- |
| 2 | $C_6H_5\overset{O}{\underset{\|}{C}}$ (4) | 1 |
| 3 | $C_2H_5\overset{O}{\underset{\|}{C}}NH-$ (4) | 1 |
| 4 | $C_2H_5O-$ (5) | 1 |
| 5 | Br (5) Br (4) | 2 |
| 6 | $CH_3NH-$ (3) | 1 |
| 7 | $(C_4H_9)_2N-$ (4) | 1 |
| 8 | $(C_2H_5)_2NCH_2-$ (4) | 1 |
| 9 | $C_7H_{15}$ (4) | 1 |
| 10 | $CF_3$ | 1 |

TABLE—Continued

| | R (position) | n |
|---|---|---|
| 11 | $CH_3S$ (3) $C_2H_5$ (5) | 2 |
| 12 | $C_4H_9$ (4) | 1 |
| 13 | $NO_2$ (4) | 1 |
| 14 | $SCH_3$ | 1 |
| 15 | Cl (4) $CH_3$ (5) | 2 |
| 16 | $C_6H_5CH_2$— (4) | 1 |
| 17 | —CN (4) | 1 |
| 18 | $C_6H_5$ (3) | 1 |
| 19 | $CH_3$—$C_6H_4$— (4) | 1 |
| 20 | $C_2H_5\overset{O}{\underset{\|}{C}}$ (4) | 1 |

It is to be understood that unsubstituted o-phenylenediamines VII, that is where R is hydrogen, can be employed to form compounds of Formula I and thereafter any of the other R radicals can be inserted in the thiadiazinobisbenzimidazole ring in place of one or two hydrogens, employing conventional procedures as will be apparent to one skilled in the art.

Examples of suitable 2-mercaptobenzimidazoles III and 2-halobenzimidazoles IV (including 2-chloro and 2-bromo) starting materials are derived from and correspond to the o-phenylenediamines set out in Table B above.

The thiadiazinobisbenzimidazoles described herein have anthelmintic activity and are useful in the treatment and/or prevention of helminthiasis, a parasitic disease which causes widespread and often serious infection in domesticated animals such as swine, horses, cattle, sheep and goats. In treating domesticated animals, the compounds may be mixed with a nontoxic, edible carrier to form a feed supplement which is then incorporated in the animal feed in the desired concentration, or they may be administered in unit dosage forms which, in the case of large domesticated animals, take the form of boluses, or in the form of a liquid drench. Alternatively, water-soluble salts or a dispersable, wettable powder containing the anthelmintic agent may be added to the drinking water of the animals.

The preferred dosage level for treating a helminth infection will depend to a large extent on the particular thiadiazinobisbenzimidazole being employed, on the severity of the infection and on the particular species of animal to be treated. In general, the thiadiazinobisbenzimidazoles exhibit anthelmintic activity when administered to animals in a daily dose of about 50 to about 300 mg. per kilogram of animal body weight. It is preferred to employ in the range of 100–200 mg. per kilogram of body weight per day. The compounds may be given in a single dose or divided into a plurality of smaller doses. If desired, the course of treatment may be extended over a period of days in which case the optimum daily dose level may be lowered. When the compounds are to be employed primarily as prophylactic agents for the prevention of helminthic infections, the preferred daily dose level is, of course, lower than the therapeutic level is, preferably in the range of about 10–70 mg. per kilogram of body weight. The thiadiazinobisbenzimidazoles may be incorporated in the animal feeds, and this method of administration is preferred when the compounds are to be used propyhylactically, in which case they are incorporated in the feeds at concentrations such that the animal will consume daily from about 10 to about 70 mg. of thiadiazinobisbenzimidazole per kilogram of body weight.

The means employed for administering these thiadiazinobisbenzimidazoles to animals are not critical and any of the methods now used or available for treating animals infected with or susceptible to parasitic infections are satisfactory. When these substances are employed therapeutically to treat an established infection, they are conveniently administered in a unit dosage form such as in a capsule, bolus, tablet, or as a liquid drench. It will be noted that all of these methods contemplate oral administration, since this is the most effective method of treating the worm-infested stomach or intestinal tract.

When the thiadiazinobisbenzimidazoles are to be administered in unit dosage form, capsules, boluses or drenches containing the desired amount of anthelmintic distributed in a pharmaceutically acceptable vehicle are usually employed. These are prepared by intimately and uniformly mixing the active ingredient with suitable finely divided diluents, suspending agents, fillers, disintegrating agents and/or binders such as starch, lactose, talc, magnesium stearate, vegetable gums and the like. These unit dosage formulations may be widely varied with respect to their total weight and content of anthelmintic agent, depending on factors such as the type of host animal to be treated, the dose level desired, and the severity and type of parasitic infestation. For large animals such as sheep, swine or cattle, boluses weighing up to 15 grams may be used, although it is preferred to employ boluses weighing from 2–10 grams and containing from 1–5 grams of the anthelmintic agent. These boluses, as well as smaller size tablets, contain binders and lubricants, and are compounded by techniques known in this art. Capsules are readily prepared by mixing the active ingredient with a diluent such as starch or lactose, and filling into the capsule.

In order to treat infected animals by means of a drench, the thiadiazinobisbenzimidazoles are mixed with a suspending agent such as bentonite and the solid product added to water just prior to administration. The preferred drenches in accordance with this invention contain from about 5–50% by weight of thiadiazinobisbenzimidazole.

The thiadiazinobisbenzimidazoles described herein may also be administered as a component of the feed of the animals or dissolved or suspended in the drinking water. According to the invention, novel feed and feed supplement compositions are provided in which compounds of Formula I above are present as an active anthelmintic ingredient. Such compositions comprise the thiadiazinobisbenzimidazoles intimately dispersed in or admixed with an inert carrier or diluent, i.e. one that is nonreactive with respect to the thiadiazinobisbenzimidazole and that may be administered with safety to the animals. The carrier or diluent is preferably one that is or may be an ingredient of the animal ration.

In the feed supplement compositions the active ingredient is present in relatively large amounts. These supplements are suitable for addition to the feed either directly or after an intermediate dilution or blending step. Examples of carriers or diluents suitable for such compositions are solid orally ingestible carriers such as distillers' dried grains, corn meal, citrus meal, fermentation residues, ground oyster shells, Atttapulgus clay, wheat shorts, molasses solubles, corn cob meal, edible vegetable substances, toasted dehulled soya flour, soybean mill feed, antibiotic mycelia, soya grits, crushed limestone and the like. The anthelmintic agents are intimately dispersed or admixed throughout the solid inert carrier by methods such as grinding, stirring, milling, or tumbling. By selecting proper diluents and by altering the ratio of carrier to active ingredient, compositions of any desired concentration may be prepared. Formulations containing from about 5% to about 50% by weight, and preferably from about 10–30% by weight, of active ingredient are particularly suitable for addition to feeds. The active compound is normally dispersed or mixed uniformly in the diluent but in some instances may be sorbed on the carrier.

Feed supplements are prepared by uniformly mixing the appropriate thiadiazinobisbenzimidazole with the carrier or carriers. Such supplements are added to the finished animal feed in an amount adequate to give the final concentration desired for controlling or treating helminthiasis by way of the animal ration. Although the preferred level in feeds will depend on the particular compound being employed, the anthelmintic compounds of this invention are normally fed at levels of 0.10–2.0% in the feed. One advantageous method of administering the compounds of this invention to animals whose feeds are conveniently pelleted, such as sheep, is to incorporate them directly in the pellets. For instance, a thiadiazinobisbenzimidazole is readily incorporated in nutritionally adequate alfalfa pellets (during the pelleting operation) at levels of 0.5 to 5 grams per pound of pellets for therapeutic use, and at lower levels for prophylactic use, and such pellets fed to the worm-infested animals. Alternatively, the thiadiazinobisbenzimidazoles may be incorporated in salt licks or salt blocks at any desired concentration (concentrations of 5–25% by weight are conveniently employed). Large animals such as sheep, cattle and goats, then receive the anthelmintics with their salt.

The following examples further illustrate the invention.

EXAMPLE 1

13H - [1,3,5]thiadiazino[3,2 - a:5,6 - a'] - bisbenzimidazole-13-thione

To a solution of 5 g. of 2-thiacyanatobenzimidazole in 20 ml. of dimethyl sulfoxide there is added at once 5 ml. of carbon disulfide and 5 ml. of triethyl amine. A yellow product begins to deposit after one minute and is filtered off after one hour. The solid is washed with ethanol to yield 3.6 g. Two crystallizations from benzene/ethyl ether furnish the analytically pure product, M.P. 184–185°, mass spectrum m/e 308 (M+).

Analysis.—Calcd. for $C_{15}H_8N_4S$ (percent): C, 58.42; H, 2.62; N, 18.17; S, 20.80. Found (percent): C, 58.42; H, 2.75; N, 18.50; S, 21.03.

EXAMPLE 2

13H - [1,3,5]thiadiazino[3,2 - a:5,6 - a'] - bisbenzimidazole-13-thione (A) Dibenzimidazol-2-yl-sulfide.—A solution of 1 g. of of 2-chloro-benzimidazole and 1 g. of 2-mercaptobenzimidazole in 30 ml. of absolute ethanol is refluxed for 45 minutes. A white, spongy solid forms. The mixture is cooled, the solid is filtered off to yield 1 g. of the sulfide. The sulfide is dissolved in 10% sodium hydroxide and the solution is filtered. The filtrate is neutralized with 10% hydrochloric acid and the resulting solid is filtered off and crystallized from ethanol, M.P. 274–275° (melts, solidifies).

Analysis.—Calcd. for $C_{14}H_{10}N_4S$ (percent): C, 63.14; H, 3.79; N, 21.04. Found (percent): C, 63.24; H, 3.85; N, 20.80.

(B) A suspension of 150 mg. of dibenzimidazol-2-yl sulfide in 20 ml. of glyme is treated with 30 mg. of sodium hydride. After two hours of stirring at room temperature, there is added 0.05 ml. of thiophosgene. After two hours of stirring at room temperature the mixture is evaporated and the yellow residue extracted repeatedly with hot benzene. The combined benzene extracts are evaporated, taken up in benzene, filtered and evaporated. This process is repeated to yield 50 mg. of product which is crystallized from benzene/ethyl ether to yield a product which is identical to that of Example 1, by IR and TLC, M.P. 180–182°.

EXAMPLE 3

2,3,9,10-tetramethyl-13H-[1,3,5]thiadiazino-[3,2-a:5, 6-a']bisbenzimidazole-13-thione To a solution of 1.9 g. of 2-thiocyano-5,6-dimethylbenzimidazole in 10 ml. of dimethyl sulfoxide there is added at once 2 ml. of triethylamine and 2 ml. of carbon disulfide. The mixture is allowed to stand at room temperature overnight. The yellow crystals are filtered off, washed with methanol and crystallized from benzene to yield 0.8 g. Recrystallization from benzene yields the analytically pure product, M.P. 338–340°. Mass spectrum m/e 364 (M+).

Analysis.—Calcd. for $C_{19}H_{16}N_4S_2$ (percent): C, 62.61; H, 4.43; N, 15.37. Found (percent): C, 62.74; H, 4.66; N, 15.46.

EXAMPLE 4

2,3,9,10-tetrachloro-13H[1,3,5]thiadiazino-[3,2-a:5, 6-a']bisbenzimidazole-13-thione Following the procedure in Example 1 but substituting 2-thiocyano-5,6-dichlorobenzimidazole for 2 - thiocyanobenzimidazole there is obtained a product of the above title.

EXAMPLE 5

1,4,8,11-tetramethoxy-13H[1,3,5]thiadiazino-[3,2-a:5, 6-a']bisbenzimidazole-13-thione Following the procedure in Example 1 but substituting 2-thiocyano-4,7-dimethoxybenzimidazole for 2-thiocyanobenzimidazole there is obtained a product of the above title.

EXAMPLE 6

2(and 3)-dimethylamino-13H-[1,3,5]thiadiazino[3,2-a:5, 6-a']bisbenzimidazole-13-thione Following the procedure in Example 2 but substituting 2 - mercapto - 5 - dimethylaminobenzimidazole for 2-mercaptobenzimidazole the above title compound is obtained.

EXAMPLE 7

2-(and 3) nitro-13H-[1,3,5]thiadiazino-[3,2-a:5, 6-a']bisbenzimidazole-13-thione Following the procedure in Example 2 but substituting 2 - chloro - 5 - nitrobenzimidazole for 2 - chlorobenzimidazole the above title compound is isolated.

EXAMPLE 8

1-(and 4) methylthio-13H-[1,3,5]thiadiazino-[3,2-a:5, 6-a']bisbenzimidazole-13-thione Following the procedure in Example 2 but substituting 2 - chloro - 4 - methylthiobenzimidazole for 2 - chlorobenzimidazole the above title compound is obtained.

EXAMPLE 9

2,3-diethyl-13H[1,3,5]thiadiazino-[3,2-a:5, 6-a']bisbenzimidazole-13-thione

Following the procedure in Example 2 but substituting 2 - mercapto - 5,6 - diethylbenzimidazole for 2-mercaptobenzimidazole the title compound is isolated.

EXAMPLE 10

2-(and 3) cyano-13H[1,3,5]thiadiazino[3,2-a:5, 6-a']bisbenzimidazole-13-thione

Following the procedure in Example 2 but substituting 2 - mercapto - 5 - cyanobenzimidazole for 2 - mercaptobenzimidazole the title compound is isolated.

EXAMPLES 11 TO 16

Following the procedure in Example 1, but substituting the 2 - thiocyanobenzimidazole shown in column A of Table I below for 2 - thiocyanobenzimidazole, there is obtained the product shown in column B.

EXAMPLES 17 TO 35

Following the procedure of Example 2, but substituting the 2-mercaptobenzimidazole shown in column A of Table II below and the 2-halobenzimidazole shown in Column B, the product shown in Column C is obtained.

TABLE I

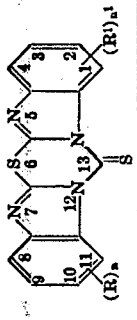

Column A     Column B

| Example number | R (position) | n | R¹ (position) | n=n¹ |
|---|---|---|---|---|
| 11 | I (8) | 1 | I (4) | As in column A |
| 12 | C₂H₅ (5, 6) | 2 | CH₃ (2, 3) | do. |
| 13 | Br (5, 6) | 2 | Cl (2, 3) | do. |
| 14 | Cl (5) | 1 | Cl (3) | do. |
| 15 | CN (4, 7) | 2 | CN (1, 4) | do. |
| 16 | OC₂H₅ (5, 6) | 2 | OCH₃ (2, 3) | do. |

TABLE II

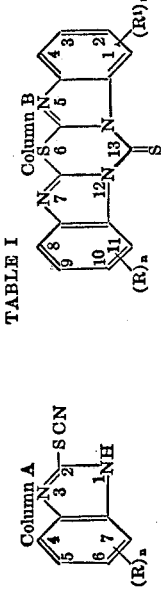    

Column A     Column B     Column C

| Example number | R (position) | n | R¹ (position) | n¹ | X | R (position) | n | n¹ | R¹ (position) |
|---|---|---|---|---|---|---|---|---|---|
| 17 | CH₃ (5, 6) | 2 | CH₃ (5, 6) | 2 | Cl | CH₃ (9, 10) | As in Columns A and B | As in Columns A and B | CH₃ (2, 3) |
| 18 | Cl (5, 6) | 2 | Br (5, 6) | 2 | Br | Cl (9, 10) | As in Columns A and B | As in Columns A and B | Br (2, 3) |
| 19 | H | --- | Br (5) | 1 | Cl | H | As in Columns A and B | As in Columns A and B | Br (2, 3) |
| 20 | H | --- | CN (4, 7) | 2 | Cl | H | As in Columns A and B | As in Columns A and B | CN (1, 4) |
| 21 | H | --- | OCH₃ (5, 6) | 2 | Br | H | As in Columns A and B | As in Columns A and B | OCH₃ (2, 3) |
| 22 | H | --- | CH₃CONH (5) | 1 | Cl | H | As in Columns A and B | As in Columns A and B | CH₃CONH (2, 3) |
| 23 | H | --- | NO₂ (5) | 1 | Cl | H | As in Columns A and B | As in Columns A and B | NO₂ (2, 3) |
| 24 | Cl—⌬ (4) | 1 | H | --- | Br | Cl—⌬ (8 or 11) | As in Columns A and B | As in Columns A and B | H |
| 25 | H | --- | C₆H₅OCONH (6) | 1 | Cl | H (2 or 3) | As in Columns A and B | As in Columns A and B | C₆H₅OCONH (2 or 3) |
| 26 | I (5) | 1 | H | --- | Br | I | As in Columns A and B | As in Columns A and B | H |
| 27 | Cl (5, 6) | 2 | N(C₂H₅)₂ (5) | 1 | Cl | Cl (9, 10) | As in Columns A and B | As in Columns A and B | N(C₂H₅)₂ (2 or 3) |
| 28 | H | --- | C₂H₅ (5, 6) | 2 | Br | H | As in Columns A and B | As in Columns A and B | CH₃ (2, 3) |
| 29 | H | --- | SCH₃ (5, 6) | 2 | Cl | H | As in Columns A and B | As in Columns A and B | SCH₃ (2, 3) |
| 30 | H | --- | ⌬ (6) | 1 | Br | H | As in Columns A and B | As in Columns A and B | ⌬ (2 or 3) |
| 31 | H | --- | Cl—⌬—CH₃ (6) | 1 | Cl | H | As in Columns A and B | As in Columns A and B | CH₃—⌬—Cl (2 or 3) |
| 32 | H | --- | C₃H₇C(O) (6) | 1 | Br | H | As in Columns A and B | As in Columns A and B | C₃H₇C(O) (2 or 3) |
| 33 | CF₃ (5) | 1 | H | --- | Cl | CF₃ (9 or 10) | As in Columns A and B | As in Columns A and B | H |
| 34 | H | --- | (CH₃)₂NCH₃ (5) | 1 | Br | H | As in Columns A and B | As in Columns A and B | (CH₃)₂NCH₃ (2 or 3) |
| 35 | p-C₂H₅C₆H₄C(O) (6) | --- | H | --- | Cl | p-C₂H₅C₆H₄C(O) (2 or 3) | As in Columns A and B | As in Columns A and B | H |

What is claimed is:
1. A compound of the formula

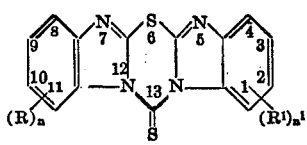

wherein R and R¹ can be the same or different and are selected from the group consisting of hydrogen; lower alkyl; monocarbocyclic aryl; monocarbocyclic aryl-lower alkyl; lower alkoxy; lower alkylthio; lower alkanoyl; lower alkenoyl; monocarbocyclic aryl-lower alkanoyl; cycloalkanoyl; cycloalkenoyl; cycloalkyl-lower alkanoyl; cycloalkenyl-lower alkanoyl; trifluoromethyl; nitro; halogen; cyano;

wherein $R^2$ is lower alkyl or monocarbocyclic aryl; di-(lower alkyl)amino; di(lower alkyl)amino-lower alkyl NHCOOR² wherein R² is lower alkyl or monocarbocyclic aryl; $n$ is 1 or 2; and $n^1$ is 1 or 2.

2. The compound as defined in claim 1 wherein R and R¹ are hydrogen.

3. The compound as defined in claim 1 having the structure

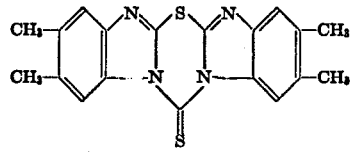

4. The compound as defined in claim 1 having the structure

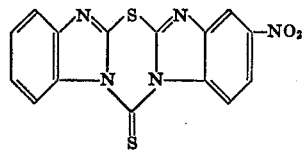

References Cited
UNITED STATES PATENTS
2,675,380   4/1954   Fielden et al. _____ 260—243
2,956,997   10/1960  Teufel _____ 260—243

JOHN M. FORD, Primary Examiner

U.S. Cl. X.R.
424—246; 260—309.2, 578, 575, 562 R

UNITED STATES PATENT OFFICE
CERTIFICATE OF CORRECTION

Patent No. 3,809,692  Dated May 7, 1974

Inventor(s) Rudiger D. Haugwitz, Venkatachala L. Narayanan

It is certified that error appears in the above-identified patent and that said Letters Patent are hereby corrected as shown below:

The headings of Table II, Column C, should read --n--, --$n^1$-- and --$R^1$(position)--.

Signed and sealed this 10th day of September 1974.

(SEAL)
Attest:

McCOY M. GIBSON, JR.  C. MARSHALL DANN
Attesting Officer  Commissioner of Patents